July 14, 1936.   F. E. ALTMAN   2,047,244
OPTICAL SYSTEM
Filed Aug. 18, 1934
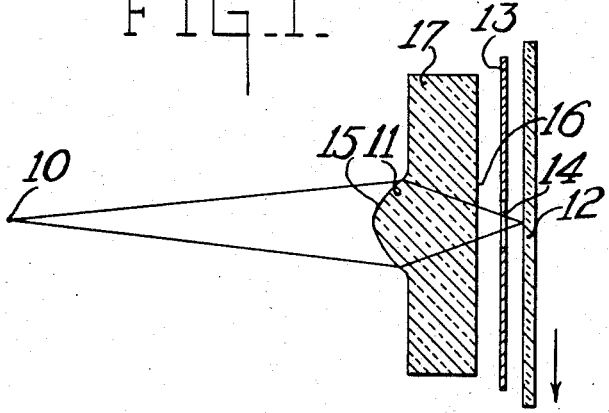
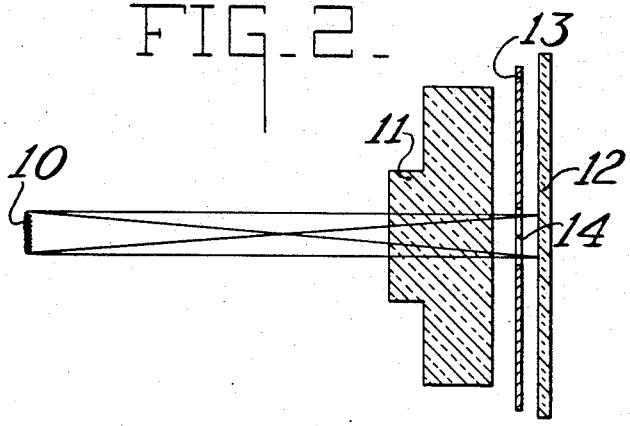
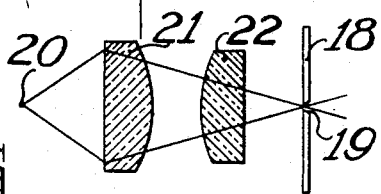
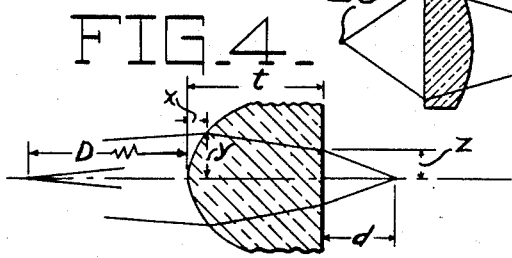
Inventor
Fred E. Altman,
By Newton M Penn
Rolla L. Carter
Attorneys Patented July 14, 1936

2,047,244

UNITED STATES PATENT OFFICE 2,047,244

OPTICAL SYSTEM

Fred E. Altman, Rochester, N. Y., assignor to Eastman Kodak Company, Rochester, N. Y., a corporation of New York Application August 18, 1934, Serial No. 740,478

4 Claims. (Cl. 88—24)

My invention relates to optical systems and particularly to optical systems peculiarly adapted to be used in sound-on-film apparatus for producing a narrow linear image of either a primary or a secondary light source upon an image area of the sound track of a photographic film.

In sound motion picture apparatus, especially of the portable type, it is desirable to have the sound optical system of short over-all length for compactness, and the spacing between the light source and the lens should not be too critical.

It is an object of my invention to provide an optical system for sound-on-film purposes in which an objective lens forms a fine line of light on the film and is sufficiently removed from the film to be free from difficulties arising from rubbing engagement.

Another object of the invention is to produce such a system which will form a modified image of high intensity and which has a minimum number of glass surfaces, thereby increasing its efficiency.

Another object of the invention is to provide an optical system which will form a greatly reduced image, making it possible to use a filament or other light source of such substantial size as to be sufficiently robust to withstand the handling most portable equipment receives.

Other objects and advantages of the invention will appear from the following description when read in connection with the accompanying drawing, and its scope will be pointed out in the appended claims.

Referring to the drawing—

Fig. 1 is a vertical section of a preferred form of the invention.

Fig. 2 is a horizontal section corresponding to Fig. 1.

Fig. 3 is a vertical section of a secondary light source which may be used in conjunction with the optical system of Figs. 1 and 2.

Fig. 4 is a fragmentary view in section of the objective lens of my invention.

According to the invention, as shown in Figs. 1 and 2, an elongated light source 10 is imaged by an objective lens 11 onto the sound track of a photographic film 12. A diaphragm 13 may be positioned between the lens 11 and the film 12 and provided with an aperture 14 for limiting the light falling on the film 12. The objective lens 11 is preferably made from a single piece of glass and is provided with a front Cartesian cylindrical surface 15 and a rear plano surface 16, the axis of this lens being transverse to the travel of the film 12, which is indicated by the arrow in Fig. 1. The cartesian surface 15 is almost a parabola and is so shaped as to correct for spherical aberration and is of relatively short focal length which, in conjunction with the low dispersion of the glass used for making the lens, reduces the chromatic aberration present to an exceedingly small value so that it does not degrade the image formed by the lens.

The Cartesian cylindrical lens 11 is shown as being formed integrally with a block of glass 17, which is the form I prefer since it makes it easy to handle and mount the lens, which would be difficult otherwise due to the small size of the lens itself. It will be understood, however, that the block of glass 17 neither adds to nor detracts from the optical characteristics of the lens 11.

Instead of using a primary light source 10, as indicated in Figs. 1 and 2, a secondary source may be used as is well known. One suitable arrangement for a secondary source is shown in Fig. 3 as comprising a sheet of opaque material 18 provided with a small physical slit 19 which may be illuminated by means of a light source 20 and lenses 21 and 22 for concentrating the light emitted by the source 20 onto the slit 19. It is hardly necessary to state that the slit 19 would be located at the position occupied by the filament 10 in the embodiment shown in Figs. 1 and 2.

The particular lens 11 which I prefer to employ makes it possible to have a very short over-all system, i. e., 50 mm. from the filament 10 to the film 12. Further, the lens of my invention makes it possible to provide a lens having a working aperture of f.1.0, free from spherical aberration, and a magnification ratio of twenty to one.

An arrangement as above described provides a so-called slitless system which is relatively insensitive to the positioning of the lamp filament or other light source and has a flat image plane.

One specific lens suitable for use in the above system will now be described in connection with Fig. 4, in which the reference character D represents the distance between the light source and the front surface of the lens; $d$ the distance the focus is behind the rear surface of the lens; $t$ the thickness of the lens at its optical axis; $x$ and $y$ the coordinates of any point on the surface of the lens; and $z$ the distance off the axis a ray entering at any point $x$, $y$ emerges from the plano surface of the lens.

This lens, to function as above described, should have a curvature such that every ray of light passing from the light source to the focus will do so in a constant time interval. Therefore, in determining the proper curvature for this surface, the following formula may be used:

$$K=\sqrt{(d^2+z^2)}+\mu\sqrt{(y-z)^2+(t-x)^2}+\sqrt{y^2+(D+x)^2}$$

In this formula K represents the constant time for any ray to travel from the light source to the focus or it may represent the optical length of the path of any ray from the source to the focus and $\mu$ the index of refraction of the glass used in making the lens.

The constant K may readily be evaluated for any particular lens by tracing a ray along the axis from the source to the focus which gives $$K=D+\mu t+d.$$

Thus K may be evaluated for a particular system chosen and the points off the axis through which the surface must pass may be calculated by substitution in the complete formula given above. As an example a suitable lens system to provide a reduction ratio of approximately 20:1 may be obtained using glass having a refractive index of 1.51 by assigning the following values expressed in millimeters to the axial dimensions; $D=46.2$, $d=1.32$, and $t=1.5$, from which it is obvious that $K=49.78$.

This particular example of a lens provides for a very short over-all system which may be less than 50 mm. from the light source to the focal plane and will work at an aperture of f.1.0 without suffering from undesirable aberrations.

The Cartesian cylindrical lens 11 is of such focal length that it forms an image of the source 10 at the film 12, and this image, as viewed in Fig. 1, is smaller in its vertical dimension than the source, in substantially the same ratio as the distances of the source and the image from the principal planes of the lens and may readily be a ratio as large as twenty to one. The lateral extent of this image is defined by the aperture 14 in the diaphragm plate 13.

It will be apparent from the above description that the Cartesian cylindrical lens made in accordance with my invention is admirably suited for use in the illuminating system of a sound-on-film apparatus. This cylindrical lens may be manufactured in any well-known manner, such as by grinding and polishing the lens itself, or by forming a suitable mold which may then be used for molding the lens.

While I have described in detail one specific Cartesian surface suitable for practicing the invention, it will be understood that various modifications may be made therein without departing from the spirit and scope of the invention, and I intend to cover all such modifications in the appended claims.

What I claim as my invention and desire to secure by Letters Patent of the United States is:

1. An optical system for focusing a narrow line of light upon an image area comprising a light source having a single linear filament and a single lens element having a Cartesian cylindrical surface facing said source and having its other surface plane, said lens element being of very short focal length and having its cylindrical surface so shaped that the image formed thereby is free from aberration when working at a relative aperture approaching f.1.0.

2. An optical system for forming a reduced image of a light source comprising a single cylindrical lens having a plane surface and a curved surface every point of which satisfies the equation—

$$K=\sqrt{(d^2+z^2)}+\mu\sqrt{(y-z)^2+(t-x)^2}+\sqrt{y^2+(D+x)^2}$$

where K is a constant; $x$ and $y$ are the coordinates of the surface; $z$ the distance off the axis a ray emerges from the plano surface; $d$ the distance between the rear surface of the lens and the image; $t$ the thickness of the lens; D the spacing of the source and the front surface of the lens; and, $\mu$ the index of refraction of the glass used.

3. An optical system for forming a reduced image free from spherical aberration, of a light source comprising a single cylindrical lens element having a working aperture greater than f.2.0, said lens element being plano-convex with its convex surface shaped as specified by the equation—

$$K=\sqrt{(d^2+z^2)}+\mu\sqrt{(y-z)^2+(t-x)^2}+\sqrt{y^2+(D+x)^2}$$

where K is a constant representing the optical length of the path of any ray from the source to the focus; $x$ and $y$ are the coordinates of the surface; $z$ the distance off the axis a ray entering the convex surface at $x$, $y$ emerges from the plano surface; $d$ the distance between the rear surface of the lens and the focus; $t$ the axial thickness of the lens; D the spacing of the source from the front surface of the lens; and $\mu$ the index of refraction of the glass employed.

4. An optical system as defined in claim 3 in which K in the equation specifying the shape of the convex surface of the lens is less than 100 mm. and D is more than twenty times greater than either $d$ or $t$.

FRED E. ALTMAN.